United States Patent

[11] 3,616,200

| [72] | Inventor | Herbert I. Reibach<br>Waynesboro, Va. |
|---|---|---|
| [21] | Appl. No. | 4,070 |
| [22] | Filed | Jan. 19, 1970 |
| [45] | Patented | Oct. 26, 1971 |
| [73] | Assignee | E. I. du Pont de Nemours and Company<br>Wilmington, Del.<br>Continuation-in-part of application Ser. No. 624,696, Mar. 21, 1967, now abandoned. |

[54] THERMAL OXIDATIVE DEGRADATION RESISTANT STRUCTURE OF AN AROMATIC POLYMER AND CERTAIN METAL COMPOUNDS
22 Claims, No Drawings

[52] U.S. Cl. .................................................... 161/225 R,
117/232 R, 161/213 R, 161/214 R, 260/18 R,
260/18 N, 260/45.7 R, 260/45.75 R, 260/45.9 R
[51] Int. Cl. ............................................... C08g 51/56,
C08g 51/60, C08g 51/62
[50] Field of Search............................................. 260/18 R,
18 N, 45.75 R, 45.9, 45.7 R; 117/232; 161/213,
214, 225

[56] References Cited
UNITED STATES PATENTS

| 3,115,474 | 12/1963 | Smith | 260/18 |
|---|---|---|---|
| 3,234,181 | 2/1966 | Olivier | 161/213 |
| 3,503,929 | 3/1970 | Londas | 117/232 |

*Primary Examiner*—Donald E. Czaja
*Assistant Examiner*—V. P. Hoke
*Attorney*—John E. Dull

ABSTRACT: A shaped structure (e.g., a fiber, molded object, or sheetlike material) of an aromatic, substantially linear, polyamide, polyimide, polyimidazole, polythiadiazole or polyoxadiazole, with the polymer being in contact with a trace amount of chloride ion, and the polymer also being in contact with specified compounds of manganese, zinc, aluminum or bismuth. Such a structure exhibits improved resistance to oxidative degradation when in contact with a copper or iron containing metal at elevated temperatures in air containing traces of water. The structure is particularly useful as insulation for electrical conductors, motors and generators.

THERMAL OXIDATIVE DEGRADATION RESISTANT STRUCTURE OF AN AROMATIC POLYMER AND CERTAIN METAL COMPOUNDS

CROSS-REFERENCE TO RELATED APPLICATION

This is a continuation-in-part of application, Ser. No. 624,696, filed Mar. 21, 1967 now abandoned.

BACKGROUND OF THE INVENTION

Certain aromatic, substantially linear condensation polymers, in particular, polyamides, polyimides, polyimidazoles, polythiadiazoles, and polyoxadiazoles are stable to very high temperatures, for example about 300° C., for prolonged time periods. Such aromatic polymers are particularly useful for high-temperature electrical insulation. However, oxidative degradation of these polymers occurs when they are contaminated with traces of chloride ion and exposed to air containing any moisture, when contacted with a copper or iron containing metal at high temperatures. Thus, in a semiclosed electrical system containing copper, wherein air having a trace of moisture may be present, oxidative degradation of such polymers contaminated with chloride ion is a particular problem.

The oxidative degradation is presumed to occur by the following mechanism: the chloride ion-containing substance reacts with moisture at elevated temperatures to release HCl. Simultaneously, the oxygen of the air attacks the metal, e.g., copper, to form an oxide coating. The volatile HCl attacks the copper oxide to form a chloride oxide of copper. This copper chloride is also volatile and, confined in the semiclosed system, contacts the aromatic polymer and catalyzes its oxidative degradation. This degradation is particularly rapid when focused on the sheet structure through a pinhole defect in an inert material separating the copper from the polymer as in a varnished copper wire where a pinhole is present in the varnish.

It is frequently difficult to avoid contaminating these aromatic polymers with chloride ion. For example, the preparative methods applicable to the aliphatic counterparts are frequently not useful in the preparation of some aromatic polymers, in particular the polyamides, polythiadiazoles, and polyoxadiazoles, due to the lower reactivity of the polymerizing radicals when attached to an aromatic ring. This reactivity problem has been overcome by use of a more reactive form of one of the reactants; for example, diacyl chlorides are used (as in the Kwolek et al. patent, U.S. Pat. No. 3,063,966). Because of this requirement, and others, traces of chloride ion, as impurity, are sometimes found in aromatic polymers. When the aromatic polymers are formed into papers, the polymer may be contaminated by the presence of chlorides in the water used in the paper-making process. These polymers may also be contaminated by handling with sweaty hands.

The term "copper or iron containing metals" as used herein means copper or iron and alloys containing copper or iron.

SUMMARY OF THE INVENTION

The present invention provides a shaped structure comprising an aromatic, substantially linear condensation polymer selected from the group consisting of a polyamide, a polyimide, a polyimidazole, a polythiadiazole and a polyoxadiazole, said polymer being in contact with a trace amount of halogen and said polymer also being in contact with about 0.1 to 15 percent based on the weight of said polymer of an inhibitor consisting of at least one member of the group (1) an oxide of manganese, zinc or bismuth, (2) a hydrated oxide, hydroxide or nitrate of manganese, zinc, bismuth or aluminum, (3) a carbonate of manganese or zinc, (4) subcarbonate or subnitrate of bismuth and (5) a manganese, zinc, aluminum or bismuth salt of an organic acid which salt decomposes to an oxide at a temperature below 300° C.

The shaped structures of this invention exhibit improved resistance to oxidative degradation when in contact with copper or iron containing metals at elevated temperatures in air containing traces of water.

DESCRIPTION OF THE PREFERRED EMBODIMENTS

The polymers used in this invention are the film and fiber forming aromatic, substantially linear condensation polymers of the class of polyamides, polyimides, polyimidazoles, polythiadiazoles and polyoxadiazoles. These well-known polymers may be represented by the formula

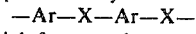

wherein —X—, which forms an integral part of the backbone of the polymer chain, is a nitrogen-containing interunit linkage from the class consisting of

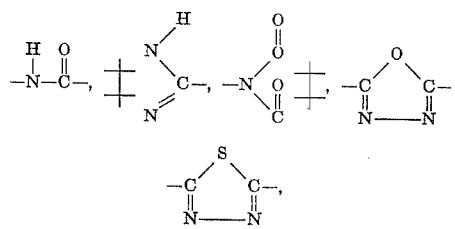

the symbol "⊥" indicating that attachment is made to adjacent carbon on the same ring system, and —Ar— is an organic radical wherein a carbon atom of a carbocyclic ring possessing nuclear resonance provides attachment for —X—

Among the diamines suitable for preparation of aromatic polyamides useful in the present invention are metaphenylene diamine, para-phenylene diamine, benzidine, 4,4'-diaminodiphenyl methane, N,N'-m-phenylene bis(m-aminobenzamide), N,N'-p-phenylene bis(m-aminobenzamide), N,N'-m-phenylene bis(p-aminobenzamide), N,N'-p-phenylene bis(p-aminobenzamide), 2,2-bis(4-aminophenyl)propane, bis(4-aminophenyl)sulfide, bis(4-aminophenyl)sulfone, 2,6-diamino-p-xylene, 4,4'-diaminobenzophenone, 4,4'-diaminodiphenyldisulfide, diazodiphenyl 4,4'-diamine, and the like and mixtures thereof, it being understood that the meta and para orientations are both suitable in those cases where only one orientation is listed.

Among the diacyl halides suitable for reacting with the above diamines in the preparation of aromatic polyamides are iso- and terephthaloyl; 4,4'-bibenzoyl; 1,2-bis(4-carbonylphenyl)ethane; bis(4-carbonylphenyl)methane; bis(3-carbonylphenyl)methane; 2,2-bis(4-carbonylphenyl)propane; bis(4-carbonylphenyl)ether; bis(4-carbonylphenoxy)ethane; bis(4-carbonylphenyl)sulfone; bis(4-carbonylphenyl)sulfide (or disulfide); bis(4-carbonyl)benzophenone, and the like and mixtures thereof, it being understood that the meta and para orientations are suitable in those cases where only one orientation is listed.

In addition to those listed in the previous paragraphs, such starting materials having one or more nonamide-forming substituents on at least one aromatic ring are suitable. By nonamide-forming is meant those which do not react with the reactive groups of either starting material to form an amide group under the conditions of polymerization. Such substituents as chloro, bromo, cyano, sulfo, nitro, lower alkyl, lower alkoxy, and lower carbalkoxy are exemplary.

The preferred aromatic polyamides are the polymers of meta-phenylene isophthalamide, for example, the homopolymers, i.e., poly(meta-phenylene isophthalamide), and copolymers, such as those formed from the condensation of meta-phenylenediamine and a mixture of isophthaloyl and terephthaloyl chlorides.

Polyoxadiazoles of the type described in the Frazer, U.S. Pat. No. 3,130,182 are benefited by this invention. The corresponding thiadiazoles are similarly improved in thermal durability by this invention. Such polymers may be made by the procedure outlined in Textile Research Journal, July, 1966, pp. 619–625: Organic Fiber-Formation Research, Spain and Picklesimer. In this procedure, about one-half of the carbonyl oxygens of the poly(isophthalic-terephthalic hydrazide) are replaced by sulfur by reaction with phosphorous pentasulfide in refluxing pyridine. The resulting poly(oxathiahydrazide) may be shaped and subsequently dehydrated to the polythiadiazole by the procedure of example 11 of this specification.

Aromatic polyamides derived from AB-type monomers also are benefited by this invention. This type of monomer is characterized by presence of both the acyl halide and amino moieties on the same molecule, and is exemplified by meta (or para) amino benzoychloride-hydrochloride.

Polybenzimidazoles of the type disclosed in the Marvel et al. U.S. Pat. No. 3,174,947 are benefited by this invention.

The polyimides and polyamide-acids of the Edwards U.S. Pat. No. 3,174,634 are suitable as a carrier for coating of copper or iron containing metals with the selected metal compound. Used in contact with copper, they are benefited by this invention.

The class of ordered copolyamides disclosed in the Preston et al. U.S. Pat. No. 3,240,760 are improved in resistance to thermal degradation in the presence of copper, iron or their alloys.

The materials, herein referred to as "inhibitors," which function to inhibit oxidative degradation in the structure of this invention are certain compounds of manganese, zinc, aluminum and bismuth, specifically, an oxide of manganese, zinc, or bismuth; a hydrated oxide, hydroxide, or nitrate of manganese, zinc, bismuth or aluminum; a carbonate of manganese or zinc; subcarbonate or subnitrate of bismuth; and an manganese, zinc, bismuth or aluminum salt of an organic acid which salt decomposes to an oxide at a temperature below 300° C. for example, the fatty acid salts such as the acetates and stearates. More than one such compound may be used.

Preferably, the inhibitor contains a hydroxide of bismuth. An especially effective inhibitor is a hydroxide and nitrate of bismuth, i.e., compound of bismuth containing hydroxyl and nitrate groups or a mixture of hydroxides of bismuth and nitrates of bismuth. The most preferred inhibitor is a hydroxide and nitrate of bismuth prepared by reaction of an aqueous slurry of bismuth trinitrate with ammonia. Preferably, such hydroxide and nitrate of bismuth contains 6 to 8 percent by weight nitrate groups.

In the structure of this invention, the aromatic polymer must be in contact with from about 0.1 percent to about 15 percent of the inhibitor based on the weight of the polymer. This contact or intimate association may be attained in any of a variety of ways. For example, the structure may be a fiber or a sheetlike material such as film, paper or fabric, impregnated or coated with the inhibitor. The aromatic polymer shaped structure may be formed or shaped in the presence of the inhibitor, as, for example, by dry spinning fibers from a polymer solution containing the inhibitor. Where a copper or iron containing metal body forms a part of the shaped structure, he inhibitor may be surface applied to the metal body which is thereafter made contiguous laminate component with the aromatic polymer.

Where the shaped structure is paper, it may be convenient to add the inhibitor to the stock (e.g., fibrids or floc or mixtures thereof) employed for paperforming, thus attaining its distribution throughout the paper. When added to the stock in paperforming, it is convenient to add it only to the fibrids stock, eliminating the need for regulation of the amount of inhibitor in a second, floc-containing stock. It is acceptable to add the inhibitor to the head box after blending of the two stocks. It may be convenient to add the inhibitor as a spray to the surface of the wet sheet in the paperforming process, which will permit partial migration through the paper structure, retaining the bulk of the inhibitor on the upper surface. This latter mode of addition may offer advantages as means for supplementing the amount of inhibitor on the air-contacting surface of the paper web where addition to the stock results in losses or migration of the inhibitor toward the wire. Papers may be made in any desired thickness with 1 to 15 mils being especially suitable for purposes of this invention.

Where a copper or iron containing metal body forms a part of the shaped structure, the inhibitor may be surface applied to the metal body which is thereafter made a contiguous component with the aromatic polymer. Application of the inhibitor to the metal body may be accomplished by any convenient means. The metal body may be dipped into a stirred dispersion of the inhibitor in water or any suitable medium and allowed to dry. It may be necessary to add a small amount of a wetting agent to assure uniform coating. Use of a suitable high-temperature varnish as a medium for application of the inhibitor to the second component offers the distinct advantage of a less fragile coating, reducing the need for special care in application of the aromatic polymer thereto.

Where such a metal body is in a shape, such as a wire, suitable for use as an electrical conduit, it is advantageous to wrap a sheetlike structure of this invention around the conduit, by means known in the art, to form an insulated electrical conduit. In this particular use of this invention, the inhibitor may be impregnated in the sheetlike structure or coated onto at least one of the surfaces thereof such that in the final shaped structure the inhibitor is contiguous with the metal.

The precise amount of inhibitor needed for the shaped structures of this invention depends on such factors as intended use, shape and thickness of the polymer portion of the structure, etc. For example, with sheetlike structures, larger amounts of inhibitor are usually necessary with relatively thin structures than thick structures. From 0.1 to 5 percent of inhibitor, based on the weight of the polymer, is usually adequate for a paper or film.

While, as pointed out above, the shaped structures of the present invention are particularly useful where intentional contact with metal is anticipated, the structures are also of value in that they resist degradation caused by the accidental contact with copper or iron containing metals, such as presence of small particles of metal sometimes picked up in the paperforming process. Obviously other materials can be present such as fillers, mica and the like. The shaped structure need not be a sheet; it can take the form of a molded article such as transformer core, shaped wedges and blocks for specific uses, etc. The products have many uses. These include use as electrical motor and generator insulators in various physical forms such as paper, molded wedges, yarn ties, etc.; transformer and capacitor insulators in the form of sheets of paper for film; cable covers and wrappers including flexible sheets and molded lead tubes; base for printed circuits, and the like. These products are also useful in hoses for high-temperature steam or fuel use, in filtration of gases from high-temperature processes such as open hearth steel, carbon-black production, etc.; in conveyor belts for foundry uses, food processing and curing ovens; as a base for reinforced laminates for pump vanes, gears, electroplating barrels, stopnut inserts, as nuts and bolts, clutch and brake linings, welding shields, etc. They also find utility in a wide range of gasket and valve packing, muffler packing and the like. Other uses include parachutes for personnel or deceleration, air-ship envelopes, fuel cells, radome covers, radiation shields and the like. In general these materials find advantageous utility in any application in which durability under high-temperature exposure is required.

EXAMPLES

The following examples are provided to further illustrate, but not limit, this invention. In these examples all parts and percentages are parts and percentages by weight.

In these examples, "inherent viscosity" (I.V.) is determined in the usual manner, employing dimethylacetamide, containing 4 percent lithium chloride as solvent, unless otherwise noted. A concentration of 0.5 g. of polymer per 100 cc. of solution is employed, and the measurements are made at 30° C.

Thermal durability is determined by (1) preparation of a sandwich consisting of, in sequence, a sheet of aluminum foil, a sheet of clean copper foil, a sheet of aluminum foil 0.005-inch thick (in which several 1/64-inch holes have been punched), a specimen of the composition to be tested, and a sheet of aluminum foil; (2) compression of the sandwich under a loading of about 0.2 p.s.i. and exposure to high temperature for a predetermined period of time (i.e., 18 hours at 300° C. unless noted to the contrary).

Table I lists the details of various examples illustrating the present invention. The type of shaped structure employed, i.e., F (film) or P (paper), is indicated along with the identity of the inhibitor, the percentage of inhibitor (by weight based on the weight of the aromatic polymer), and the method by which the inhibitor was applied to the polymer. The polymers employed in the various examples are identified in table II. Each paper is made using fibrids as taught in Morgan U.S. Pat. No. 2,999,788 and 2-denier-per-filament floc (fiber of about ¼-inch cut length) in a 65/35, fibrid/floc ratio (except example 4 which employs a 60/40 ratio).

In each case fibrid and floc is formed from he same polymer. After paperforming on a screen (examples 1, 2, 4 and 12 employ a Fourdrinier screen; in other examples the sheets are formed as hand sheets), the sheet is calendered at high temperature and pressure to provide a dense, smooth structure of a nominal 3-mil thickness. In examples 1, 2, 6 through 11, 20 and 21, the inhibitor is applied to the shaped structure by immersion of the structure into an aqueous dispersion containing 5 percent by weight of the inhibitor. In examples 3, 13 through 17 and 22, the inhibitor is added to the paperforming stock (containing fibrids and floc at a consistency of 0.25 percent) at a concentration of 3 percent by weight based on solids present. In example 4, the inhibitor is added to the floc chest of a Fourdrinier machine at a level of 18 percent and to the fibrids chest at a level of 7 percent. (One chest contains fibrids prepared at 0.6 percent consistency, while the other contains floc at a consistency of 0.25 percent. Both stocks are at a pH of 7. The two stocks are blended to provide a 60/40 ratio, solids basis: fibrids/floc). In example 5, fibrids are prepared (using apparatus of Duggins, U.S. Pat. No. 3,018,091) from a dimethylacetamide solution containing 11 percent polymer, 5.1 percent calcium chloride and 5 percent by weight, based on polymer, of inhibitor. In example 12, the inhibitor is dusted onto a tacky silicone varnish applied to a copper plate; after baking the dusted plate, it is used contiguous to the polymeric sheet in laminate form. After the inhibitor has been applied to the shaped structure, the usual procedure is to air dry it and then press it at 490° F. under 1,000 p.s.i. (Calendering at 281° C. under 700 pounds per linear inch is employed in example 4; drying at room temperature is employed in examples 6, 8, 9, 10 and 11). In examples 18 and 19, the inhibitor is applied by immersion of the structure into an aqueous dispersion containing 1 percent by weight of the inhibitor. The films employed were cast from a 20 percent solution of solids dissolved in dimethylacetamide, except in examples 10 and 11. In example 11 the film was cast from a 20 percent solids solution in dimethylsulfoxide followed by precipitation with water and boiling off to eliminate the solvent. The polymer is then dried by heating at 275° C. for 24 hours and subsequently heated for a few minutes at 320° C. to condense the polymer to the corresponding polyoxadiazole by elimination of water. The film contains traces of chloride from the polymer preparation (involving terephthaloyl and isophthaloyl chlorides). With reference to example 10, a film of the polymer is cast from a 4.76 percent solution of the polymer in tetramethylurea. The gel is flooded on the casting plate with cold water for about 10 minutes, which causes the film to lift from the plate and extracts most of the solvent. The water is removed and the film restrained by magnets on the plate while it is heated for about 18 hours at 160° C. to drive out the water. The film prepared in this manner contains traces of chloride ion resulting from its preparation (solution polymerization of para-aminobenzoyl chloride hydrochloride). The films of examples 8 and 9 are soaked in a 1 percent aqueous solution of hydrochloric acid for 30 minutes at 50° C. and are dried without rinsing prior to the application of the inhibitor. The bismuth hydroxide used in examples 1, 3, 5a and 12 is a commercially available product. In examples 6 through 11 and 13, the preferred inhibitor, a hydroxide and nitrate of bismuth is employed which was prepared as follows: To 2,000 parts water is added 28.4 parts concentrated nitric acid. To this solution is added with vigorous stirring 454 parts of $Bi(NO_3)_3 \cdot 5H_2O$. A fine dispersion results. To this slurry is added 454 parts of concentrated ammonium hydroxide with continued agitation. The pH at this stage is between 10 and 11. The resulting precipitate is filtered off and washed three times by slurrying in about 3,800 parts water and filtering. After drawing as dry as possible on the filter, the precipitate is slurried in about 2,400 parts dry acetone, filtered and dried at 70° to 80° C. for about 18 hours. The product from several runs is found to contain about 6 to 8 percent nitrate groups by weight, as determined by the standard colorimetric method described in Standard Methods for Examination of Water and Waste Water, American Public Health Association, 11th Edition, Section 1, Part A, page 175. In this analytical technique the polymer sample is dissolved in aqueous sulfuric acid, diluted with water then phenoldisulfonic acid is added and the resultant yellow nitrate complex is determined colorimetrically. In every example the thermal durability test is applied, and no appreciable degradation occurs to sheets or films of the present invention at the spots where perforation of the aluminum foil has permitted exposure to the copper. In the absence of the inhibitor treatment, degradation at each minute copper exposure is sufficient to result in perforation of the paper.

TABLE I

| Example | Type sheet | Inhibitor | Percent inhibitor retained | Application method |
|---|---|---|---|---|
| 1 | P | Bismuth hydroxide. | 3 | Immersion. |
| 2 | P | Manganese dioxide.[2] | 1 | Do. |
| 3 | P | Bismuth hydroxide. | 3 | Added as paper component. |
| 4 | P | Hydrated alumina | 4.7 | Do. |
| 5a | P | Bismuth hydroxide. | 5 | Do. |
| 5b | P | Zinc carbonate | 6 | Do. |
| 6 | F | Hydroxide and nitrate of bismuth. | 3 | Immersion. |
| 7 | P | ----do---- | 3 | Do. |
| 8 | F | ----do---- | 3 | Do. |
| 9 | F[1] | ----do---- | 3 | Do. |
| 10 | F | ----do---- | 3 | Do. |
| 11 | F[1] | ----do---- | 3 | Do. |
| 12 | P | Bismuth hydroxide. | 3 | Added as a component of metal structure. |
| 13 | P | Hydroxide and nitrate of bismuth. | 2 | Added as paper component. |
| 14 | P | Bismuth subcarbonate. | 2 | Do. |
| 15 | P | Bismuth subnitrate. | 2.5 | Do. |
| 16 | P | Bismuth oxide | 3 | Do. |
| 17 | P | Aluminum nitrate. | 2 | Do. |
| 18 | P | Manganese nitrate. | 1 | Immersion. |
| 19 | P | Zinc nitrate | 1 | Do. |
| 20 | P | Zinc oxide | 3 | Do. |
| 21 | P | Zinc acetate | 3 | Do. |
| 22 | P | Zinc stearate | 2 | Added as paper component. |

[1] Durability test at 350° C. for 18 hours.
[2] Inorganic Synthesis, vol. VII, pg. 174.

TABLE II

| Example | Polymer | I.V. |
| --- | --- | --- |
| 1 | poly (meta-phenylene isophthalamide) | 1.5 |
| 2 | do | 1.5 |
| 3 | do | 1.5 |
| 4 | do | 1.5 |
| 5 | do | 1.5 |
| 6 | Copolyamide from m-phenylene diamine/3,3'-dichlorobenzidene (75/25 molar ratio) and isophthaloylchloride. | 1.8 |
| 7a | Polyamide from 4,4'-diaminodiphenyl ether and isophthaloylchloride. | 1.84 |
| 7b | Copolyamide from meta-phenylene diamine and isophthaloylchloride/terephthaloylcholride (15/85 molar ratio). | 1.32 |
| 7c | Polyamide from N,N'-m-phenylene bis-(m-aminobenzamide) and isophthaloylchloride (Ex. V of U.S.P. 3,240,760). | 2.24 |
| 8 | Polybenzimidazole from 3,3'-diaminobenzidine and diphenylisophthalate. | 0.5 |
| 9 | Polyimide from the polyamide-acid from pyromellitic dianhydride and 4,4'-diaminodiphenyl ether (Ex. 35 of U.S.P. 3,179,630). | |
| 10 | Poly(1,4-benzamide) | 1.38 |
| 11 | Polyoxadiazole from the polyhydrazide from isophthalic dihydrazide and terephthaloyl chloride (Ex. III of U.S.P. 3,130,182). | 1.86 |
| 12-22 | Poly(meta-phenylene isophthalamide) | 1.5 |

I claim:

1. A shaped structure comprising an aromatic, substantially linear condensation polymer selected from the group consisting of a polyamide, a polyimide, a polyimidazole, a polythiadiazole and a polyoxadiazole, said polymer being in contact with a trace amount of chloride ion and said polymer also being in contact with about 0.1 to 15 percent based on the weight of said polymer of an inhibitor consisting of at least one member (1) an selected from the Group consisting of unhydrated oxide of manganese, zinc or bismuth, (2) a hydrated oxide, hydroxide or nitrate of manganese, zinc, bismuth or aluminum, (3) a carbonate of manganese or zinc, (4) a subcarbonate or subnitrate of bismuth, and (5) a manganese, zinc, aluminum or bismuth salt of an organic acid which salt decomposes to an oxide at a temperature below 300° C.

2. The structure of claim 1 wherein said inhibitor contains a hydroxide of bismuth.

3. The structure of claim 1 wherein said inhibitor is a hydroxide and nitrate of bismuth.

4. A shaped structure comprising an aromatic, substantially linear polyamide said polyamide containing chloride ion as impurity and said polyamide being in contact with about 0.1 to 15 percent based on the weight of said polyamide of an inhibitor consisting of at least one member selected from the Group consisting of (1) an unhydrated oxide of manganese, zinc, or bismuth, (2) a hydrated oxide, hydroxide or nitrate of manganese, zinc, bismuth or aluminum, (3) a carbonate of manganese or zinc, (4) a subcarbonate or subnitrate of bismuth, and (5) a manganese, zinc, aluminum or bismuth salt of an organic acid which salt decomposes to an oxide at a temperature below 300° C.

5. The structure of claim 4 wherein said inhibitor contains a hydroxide of bismuth.

6. The structure of claim 4 wherein said inhibitor is a hydroxide and nitrate of bismuth.

7. The structure of claim 6 wherein said inhibitor contains 6 to 8 percent nitrate groups based on the weight of said inhibitor.

8. The structure of claim 7 wherein said inhibitor is prepared by reacting an aqueous slurry of bismuth trinitrate with ammonia.

9. The structure of claim 4 wherein said polyamide is contiguous to said inhibitor and said inhibitor is contiguous in turn to a copper or iron containing metal.

10. The structure of claim 4 wherein said structure is sheet-like.

11. The structure of claim 10 wherein said structure is a paper.

12. The structure of claim 11 wherein said polyamide is a polymer of meta-phenylene isophthalamide.

13. The structure of claim 12 wherein said inhibitor contains a hydroxide of bismuth.

14. The structure of claim 12 wherein said inhibitor is a hydroxide and nitrate of bismuth.

15. The structure of claim 14 wherein said inhibitor contains 6 to 8 percent nitrate group based on the weight of said inhibitor.

16. The structure of claim 15 wherein said inhibitor is prepared by reacting an aqueous slurry of bismuth trinitrate with ammonia.

17. The structure of claim 15 wherein said inhibitor is coated onto at least one surface of the paper.

18. A structure wherein the paper of claim 17 is wrapped around a copper or iron-containing metal body such that a surface coated with said inhibitor is contiguous with said metal body.

19. The structure of claim 15 wherein said paper is impregnated with said inhibitor.

20. A structure wherein the paper of claim 19 is wrapped around a copper or iron-containing metal body.

21. The structure of claim 15 wherein said inhibitor is distributed uniformly throughout said paper.

22. A structure wherein the paper of claim 21 is wrapped around a copper or iron-containing metal body.

* * * * *